June 27, 1933.  W. C. HEDGCOCK  1,916,152
TRUCK
Filed Oct. 5, 1931  2 Sheets-Sheet 1
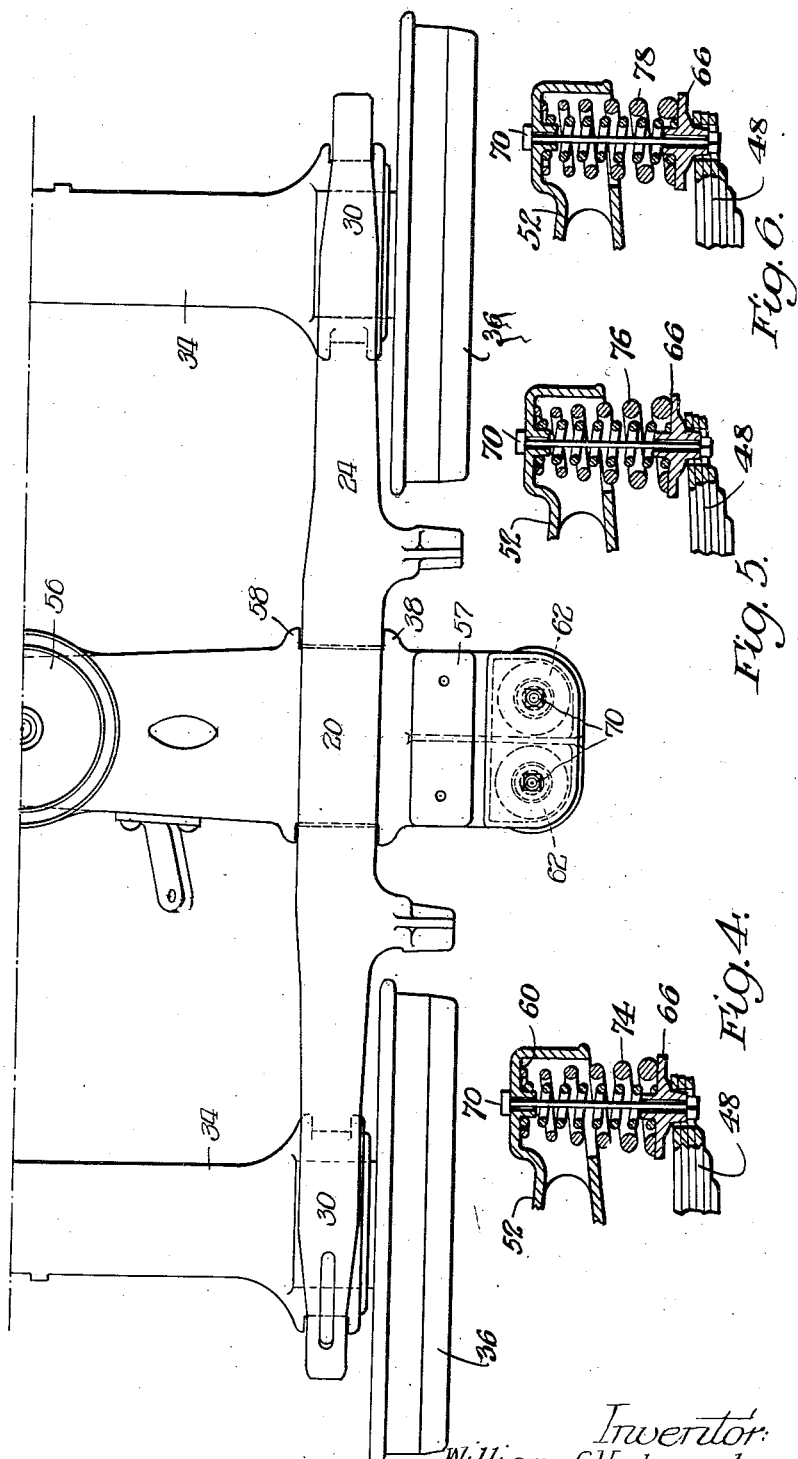
Inventor:
William C Hedgcock,
By Wilkinson, Huxley, Byron & Knight
Attys June 27, 1933.  W. C. HEDGCOCK  1,916,152
TRUCK
Filed Oct. 5, 1931  2 Sheets-Sheet 2
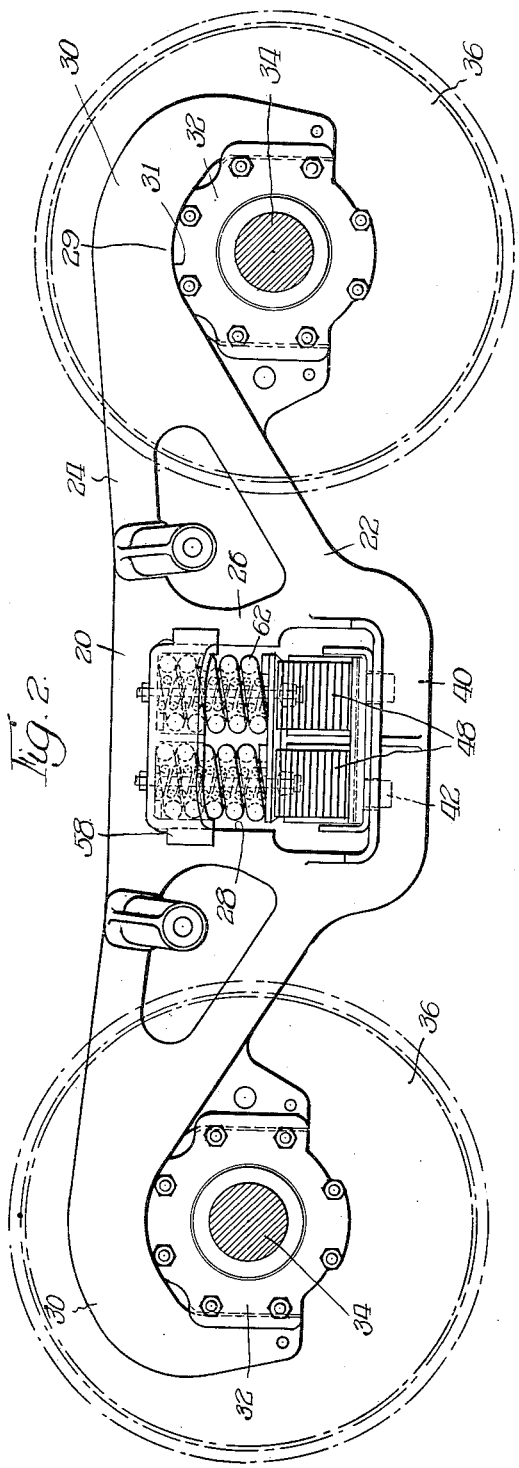
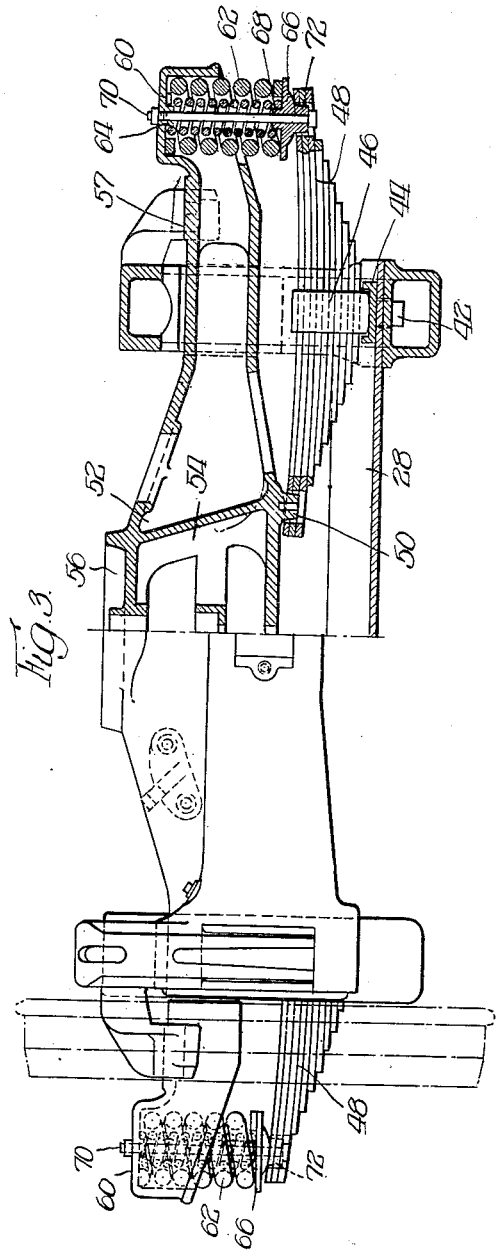
Inventor
William C. Hedgcock,
By Dickinson, Huxley, Byron Knight
attys.

Patented June 27, 1933

1,916,152

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed October 5, 1931. Serial No. 566,878.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series.

Yet another object of the invention is to provide a car truck having springs of different characteristics in series and so disposed that complete duplication of carrying capacity is not required in both kinds of springs.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

A yet further object is to provide a truck construction wherein resilient pads are provided for dampening out metallic vibrations transmitted through the metallic truck parts, and also for the purpose of deadening noise.

Another further object is to provide a truck construction wherein resilient and friction means are disposed in series.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

A still different object is to provide an inboard truck having the advantages of construction, maintenance and riding qualities enumerated above.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of the truck construction embodying the invention;

Figure 2 is a side elevation of the truck construction shown in Figure 1;

Figure 3 is an end elevation partly in section of the truck construction shown in Figures 1 and 2, the section being taken substantially on the transverse center line of the truck;

Figure 4 is a transverse fragmentary sectional elevation through the end of the bolster and resilient supporting means showing the use of a tapered spring of constant pitch and variable diameter, the same being taken substantially on the transverse center line of the truck;

Fig. 5 is a transverse fragmentary sectional elevation through the end of the bolster and resilient supporting means showing the use of a tapered spring of variable pitch and variable diameter, the same being taken substantially on the transverse center line of the truck;

Figure 6 is a transverse fragmentary sectional elevation through the end of the bolster and resilient supporting means showing the use of a tapered spring of variable pitch and constant diameter, the same being taken substantially on the transverse center line of the truck.

This construction has particular reference to inboard trucks wherein the side frames are disposed inside or between the wheels.

In the type of truck illustrated, the side frame 20 is of integral truss construction and includes the tension member 22 and compression member 24 integrally connected by means of the spaced column guides 26 forming a window or bolster opening 28. The tension and compression members merge adjacent their ends and are provided with the seat 29 and depending pedestal jaws 30 cooperating with suitable bearing surfaces 31 and 32 provided on the outer axle 34, the outer axle being part of a wheel and axle assembly 36 such as used on inboard trucks. This type may include an inner rotatable axle upon which the wheels are mounted, anti-friction bearings being disposed between said axle and an outer non-rotatable casing or axle provided with bearing surfaces for cooperative relation with the pedestal jaws. It will of course be understood that the jaws may be provided with suitable journal boxes of any preferred type cooperating with any type of wheel and axle assembly for an inboard truck.

The spaced side frames are connected by means of the spring plank 38 extending transversely of the truck for maintaining the side frames in squared relation, the spring plank extending into the bolster opening and being secured to the lower arch bar 40 of the side frame by means of the depending dowels 42 provided on the spring seat 44, said spring seat being preferably disposed on the longitudinal center line of the side frames. The spring seats 44 are adapted to accommodate the spring band 46 of the semi-elliptic leaf spring assemblies 48, the band being preferably provided with an arcuate seat engaging portion. The inner ends of the semi-elliptic springs are suitably apertured for cooperation with the depending positioning dowels 50 provided on the bolster 52, the dowels 50 being preferably provided below the vertically sloping brace members 54 extending between the upper and lower members of the bolster a direct acting support thus being formed between said spring and bolster.

The bolster is provided with the center bearing 56 and side bearings 57 and with the lugs 58 adapted to embrace the column guides 26 for guiding cooperation therewith. The bolster extends through the bolster opening 28 and outwardly of the side frames and wheel and axle assemblies, the outer ends of said bolster being provided with the coil spring seats 60, the coil spring assemblies 62 engaging said seats and being positioned by means of the depending dowel 64. The lower ends of the coil spring assemblies are supported on the spring cap 66, being positioned by the upstanding dowel 68, the bolt 70 extending through the seats 60 and the spring cap 66 for facilitating assembly.

The coil spring assemblies 62 may be of any preferred construction, such as constant pitch, variable pitch, variable stiffness, variable sectional area, or any of the springs such as shown in application Serial No. 552,153, filed July 21, 1931. The spring cap 66 is provided with the depending positioning dowel 72 adapted to be received in a suitable aperture provided in the outer leg of the leaf spring assembly 48. Rubber or other resilient pads may be provided between the springs and/or the truck parts for deadening noise.

In Figure 4 there is illustrated a construction wherein a tapered spring 74 of constant pitch and variable diameter is interposed between the seat 60 and the spring cap 66 supported on the leaf spring 48, the construction being similar to that illustrated in Figure 3, the spring 74 replacing the spring 62. In Figure 5 a tapered spring 76 of variable pitch and variable diameter is used in place of the spring 62; and in Figure 6 a tapered spring 78 of variable pitch and constant diameter is used in place of the spring 62.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

What is claimed is—

1. In an inboard truck, the combination of wheel and axle assemblies, a side frame disposed inwardly of the wheels of said assemblies, a substantially box section bolster having a center post, a leaf spring seat disposed on said bolster substantially in alignment with said center post, a spring seat disposed adjacent the ends of said bolster, a leaf spring supported intermediate the ends thereof on said side frame and engaging said first named seat, and a metallic spring interposed between the end of said first named spring and said second named seat.

2. In an inboard truck, the combination of wheels and axle assemblies, a side frame disposed inwardly of the wheels of said assemblies, a substantially box section bolster having a center post, a leaf spring seat disposed substantially in alignment with said center post, a spring seat disposed adjacent the ends of said bolster, a leaf spring supported intermediate the ends thereof on said side frame and engaging said first named seat, and a coil spring interposed between an end of said first-named spring and said second named seat.

3. In an inboard truck, the combination of wheel and axle assemblies, a side frame disposed inwardly of said assemblies, a substantially box section bolster having a center post including spaced struts, a leaf spring seat disposed in alignment with one of said struts, a spring seat disposed adjacent the ends of said bolster, a semi-elliptic leaf spring supported intermediate the ends thereof on said side frame and having the inner end thereof engaging said first named seat, and a metallic spring interposed between the outer end of said semi-elliptic spring and said second named seat.

4. In an inboard truck, the combination of wheel and axle assemblies, a side frame disposed inwardly of said assemblies, a substantially box section bolster having a center post including spaced struts, a leaf spring seat disposed in alignment with one of said struts, a spring seat disposed adjacent the ends of said bolster, a semi-elliptic leaf spring supported intermediate the ends thereof on said side frame and having the inner end thereof engaging said first named seat, and a coil spring interposed between the outer end of said semi-elliptic spring and said second named seat.

5. In an inboard truck, the combination of wheel and axle assemblies, a side frame disposed inwardly of said assemblies, a substantially box section bolster having a center post including spaced struts, a leaf spring seat disposed in alignment with one of said struts, a spring seat disposed adjacent the ends of said bolster, a semi-elliptic leaf spring supported intermediate the ends thereof on said side frame and having the inner end thereof engaging said first named seat, and a coil spring interposed between the outer end of said semi-elliptic spring and said second named seat, said coil spring being of variable pitch.

6. In an inboard truck, the combination of wheel and axle assemblies, a side frame disposed inwardly of said assemblies, a substantially box section bolster having a center post including spaced struts, a leaf spring seat disposed in alignment with one of said struts, a spring seat disposed adjacent the ends of said bolster, a semi-elliptic leaf spring supported intermediate the ends thereof on said side frame and having the inner end thereof engaging said first named seat, and a coil spring interposed between the outer end of said semi-elliptic spring and said second named seat, said coil spring being of variable stiffness.

7. In an inboard truck, the combination of wheel and axle assemblies, a side frame disposed inwardly of said assemblies, a substantially box section bolster having a center post including spaced struts, a leaf spring seat disposed in alignment with one of said struts, a spring seat disposed adjacent the ends of said bolster, a semi-elliptic leaf spring supported intermediate the ends thereof on said side frame and having the inner end thereof engaging said first named seat, and a coil spring interposed between the outer end of said semi-elliptic spring and said second named seat, said coil spring being of variable section.

8. In an inboard truck, the combination of wheel and axle assemblies, a side frame disposed inwardly of said assemblies, a substantially box section bolster having a center post including spaced struts, a leaf spring seat disposed in alignment with one of said struts, a spring seat disposed adjacent the ends of said bolster, a semi-elliptic leaf spring supported intermediate the ends thereof on said side frame and having the inner end thereof engaging said first named seat, and a coil spring interposed between the outer end of said semi-elliptic spring and said second named seat, said coil spring being of tapering section.

9. In an inboard truck, the combination of wheel and axle assemblies, a side frame disposed inwardly of said assemblies, a substantially box section bolster having a center post including spaced struts, a leaf spring seat disposed in alignment with one of said struts, a spring seat disposed adjacent the ends of said bolster, a semi-elliptic leaf spring supported intermediate the ends thereof on said side frame and having the inner end thereof engaging said first named seat, and a coil spring interposed between the outer end of said semi-elliptic spring and said second named seat, said coil spring being of tapering section and constant pitch.

10. In an inboard truck, the combination of wheel and axle assemblies, a side frame disposed inwardly of said assemblies, a substantially box section bolster having a center post including spaced struts, a leaf spring seat disposed in alignment with one of said struts, a spring seat disposed adjacent the ends of said bolster, a semi-elliptic leaf spring supported intermediate the ends thereof on said side frame and having the inner end thereof engaging said first named seat, and a coil spring interposed between the outer end of said semi-elliptic spring and said second named seat, said coil spring being of tapering section and variable pitch.

11. In an inboard truck, the combination of wheel and axle assemblies, a side frame disposed inwardly of said assemblies, a substantially box section bolster having a center post including spaced struts, a leaf spring seat disposed in alignment with one of said struts, a spring seat disposed adjacent the ends of said bolster, a semi-elliptic leaf spring supported intermediate the ends thereof on said side frame and having the inner end thereof engaging said first named seat, and a coil spring interposed between the outer end of said semi-elliptic spring and said second named seat, said coil spring being of constant pitch.

12. In an inboard truck, the combination of a side frame having a tension and compression member and spaced column guides, a bolster having guide members slidably cooperating with said guides and having center and side bearings, said side bearings being disposed on an end portion of said bolster extending outwardly of said side frame, a leaf spring mounted on said side frame between said guides and having an end disposed inwardly of said side frame and in supporting relation to said bolster, said spring having an outer end disposed outwardly of said side frame, and a coil spring interposed between said outer end of said spring and said end portion of said bolster.

13. In a car truck, the combination of a side frame having tension and compression members and spaced column guides, a substantially box section bolster having a center post including spaced struts, said bolster having guide members slidably cooperating with said guides and having an end portion extending outwardly of the side frame, a leaf spring seat disposed on said bolster substantially in alignment with one of said struts, a spring seat disposed adjacent the ends of said bolster on said end portion, a leaf spring supported intermediate the ends thereof on said side frame and engaging said first named seat, and a metallic spring interposed between the outer end of said first named spring and said second named seat.

14. In a car truck, the combination of a side frame having tension and compression members and spaced column guides, a substantially box section bolster having a center post including spaced struts, said bolster having guide members slidably cooperating with said guides and having an end portion extending outwardly of the side frame, a leaf spring seat disposed on said bolster substantially in alignment with one of said struts, a spring seat disposed adjacent the ends of said bolster on said end portion, a leaf spring supported intermediate the ends thereof on said side frame and engaging said first named seat, and a coil spring interposed between the outer end of said first named spring and said second named seat.

15. In a car truck, the combination of a side frame having tension and compression members and spaced column guides, a substantially box section bolster having a center post including spaced struts, said bolster having guide members slidably cooperating with said guides and having an end portion extending outwardly of the side frame and provided with a side bearing, a leaf spring seat disposed on said bolster substantially in alignment with one of said struts, a spring seat disposed adjacent the ends of said bolster on said end portion, a leaf spring supported intermediate the ends thereof on said side frame and engaging said first named seat, and a metallic spring interposed between the outer end of said first named spring and said second named seat.

16. In a car truck, the combination of a side frame having tension and compression members and spaced column guides, a substantially box section bolster having a center post including spaced struts, said bolster having guide members slidably cooperating with said guides and having an end portion extending outwardly of the side frame and provided with a side bearing, a leaf spring seat disposed on said bolster substantially in alignment with one of said struts, a spring seat disposed adjacent the ends of said bolster on said end portion, a leaf spring supported intermediate the ends thereof on said side frame and engaging said first named seat, and a coil spring interposed between the outer end of said first named spring and said second named seat.

Signed at Chicago, Illinois, this 26th day of September, 1931.

WILLIAM C. HEDGCOCK.